A. A. WARNER.

PERCOLATOR.

APPLICATION FILED MAR. 25, 1914.

Reissued Oct. 26, 1915. 14,004.

Witnesses:

R. W. Edwards

Geo. D. Morgan

Inventor:

Alonzo A. Warner.

By Louis M. Schmidt

Atty.

UNITED STATES PATENT OFFICE.

ALONZO A. WARNER, OF NEW BRITAIN, CONNECTICUT, ASSIGNOR TO LANDERS, FRARY & CLARK, OF NEW BRITAIN, CONNECTICUT, A CORPORATION.

PERCOLATOR.

14,004. Specification of Reissued Letters Patent. Reissued Oct. 26, 1915.

Original No. 860,273, dated July 16, 1907, Serial No. 366,285. Application for reissue filed March 25, 1914. Serial No. 827,240.

*To all whom it may concern:*

Be it known that I, ALONZO A. WARNER, a citizen of the United States, residing at New Britain, in the county of Hartford and State of Connecticut, have invented certain new and useful Improvements in Percolators, of which the following is a specification.

My invention relates to improvements in percolators, and the object of my improvement is to improve the efficiency of the spreader upon which the liquid falls from the fountain tube, by a construction that compels the liquid to pass through the said spreader in drops, no matter how full of liquid the spreader may be.

Figure 1:
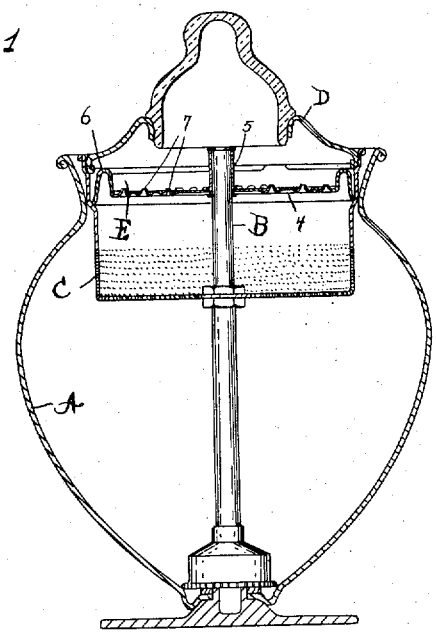
Figure 2:
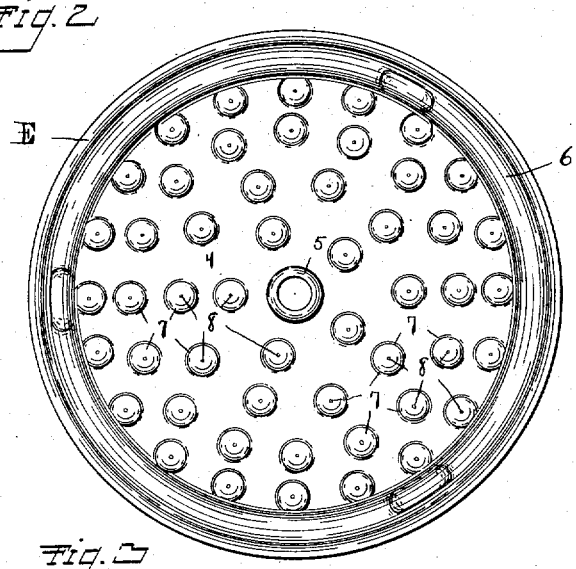
Figure 3:
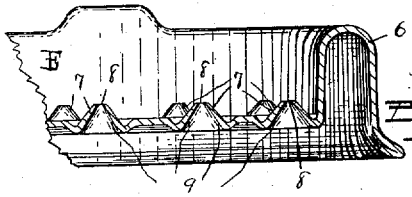

In the accompanying drawing, Figure 1 is a central vertical section of a percolator with my improved spreader in the drip cup, the fountain tube of the said percolator being shown in side elevation. Fig. 2 is an enlarged plan view of the spreader, and Fig. 3 is a still further enlarged sectional view of a portion of the spreader on the line *x x* of Fig. 2.

The percolator vessel A, its fountain tube B with connected parts, the drip cup C and the cover D may be of any ordinary construction. In the upper part of the drip cup, above the ground coffee or other material for the percolator to act upon, is the spreader or retainer E. It is provided with a spreader plate 4, a central tube 5 mounted on the said spreader plate, to receive the upper end of the fountain tube B, and with a raised rim 6 to compel the liquid that falls on the spreader plate from the fountain tube to pass through the said plate or flow over the rim thereof.

The parts thus far described are older than the invention which is the subject of this application, although as shown they are largely of my invention.

Heretofore this and similar retainers have had their spreader plates in the form of strainers, one form of which is shown in my Patent No. 821,445, dated May 22, 1906. In my present improvement the perforated or spreader plate 4 at bottom of the retainer is provided with a series of drop formers consisting of a downwardly projecting annular rim 9 inclosing an upwardly directed hollow cone 7 having a perforation 8 at the apex, as best shown in the enlarged sectional view in Fig. 3. The outer portion of the annular rim 9 constitutes an annular shoulder that is upwardly directed relatively to the lower end or base portion of the cone 7.

In a percolator of the above construction the liquid that falls on the spreader plate within the retainer or spreader, works through the perforations 8, collects within the hollow cones and falls therefrom in large drops and never in a continuous stream, no matter how full the retainer may be. In view of this fact, the rim or overflow 6 around the edge of my spreader plate may be made higher than heretofore, because a body of liquid on the top of the plate does not cause the liquid to discharge in streams. The ordinary spreader plates with a simple strainer are made shallow so that they cannot contain such a depth of liquid as would increase the tendency to force the liquid through the plate in streams.

In order to insure the discharge of the liquid from each of the several droppers in drops, it is necessary to provide means for first collecting the liquid, second, for forming it into drops, and means for compelling the drops so collected and formed to fall directly from each dropper instead of running laterally on the under face of the spreader plate. Accordingly, the hollow cones 7, with the central perforations 8 serve as means for collecting the liquid and forming it into drops, while the depending annular rims 9 when combined with said collecting means serve to maintain the separate character of the individually formed drops and compel them to fall directly from each of the several cones. The inner surface of the hollow cones adjacent the central perforations constitute what I term an under collecting surface. The said collecting surface serves as a supporting means for a drop in each case, the said drop being supported during the collecting period by adhesion. When the drop has been built up to such a size that the gravity exceeds the adhesion, then the drop will break away, and a new one will immediately begin to form. As each drop breaks away the rim around each dropper compels the drop to fall directly from each individual hollow cone, prevents drops from adjacent cones from running together on the under side of the body portion of the spreader plate and discharging in a stream or streams. Were it not for the employment of an annular rim for each dropper the discharge from two or more of the hollow cones would run together on the under side of the body of the spreader plate. The percolating effect of the liquid thus falling in drops upon the ground coffee or other material in the drip cup, is believed to be more efficient than would be the same amount of liquid passing therethrough in a continuous stream, besides distributing the material over a larger surface of the spreader plate than it would be distributed if the liquid passed through in a stream or streams. It also distributes the liquid more evenly than it can be distributed when the discharge from several perforations run together on the underside of the spreader plate before falling, no matter whether it falls in drops or streams.

I claim as my invention:—

In a percolator, the combination of a drip cup and fountain tube, with a retainer having a spreader plate in the upper part of the drip cup, the said spreader plate being formed of sheet metal with a series of upwardly projecting struck up hollow cones, perforated for the admission of liquid thereto, and a depending annular rim around the base of the said hollow cones on the underside of the said spreader plate.

ALONZO A. WARNER.

Witnesses:

D. CLARK SMITH,
JAMES E. USHER.

Copies of this patent may be obtained for five cents each, by addressing the "Commissioner of Patents, Washington, D. C."